UNITED STATES PATENT OFFICE.

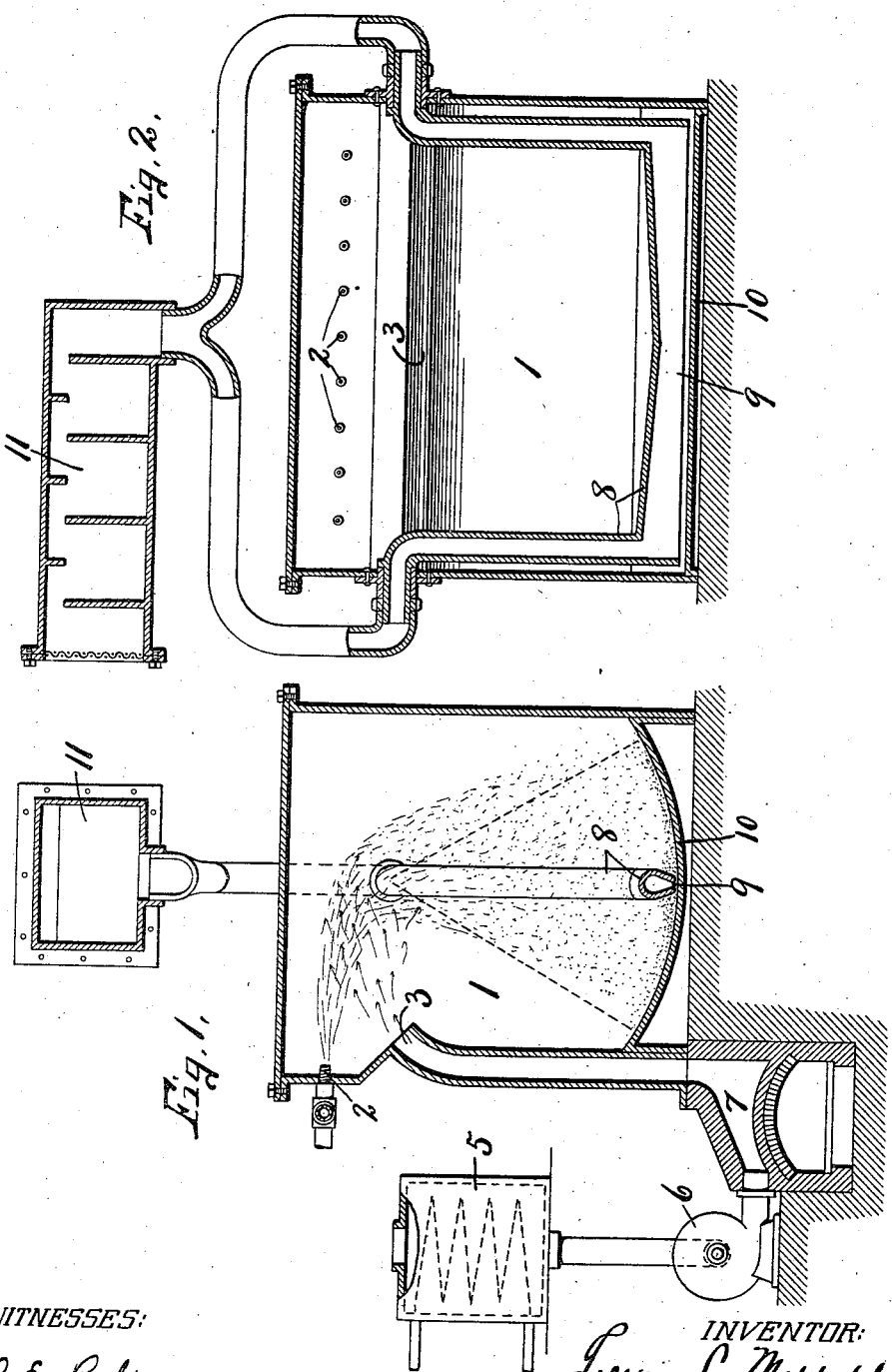

LEWIS C. MERRELL, OF SYRACUSE, NEW YORK, ASSIGNOR TO MERRELL-SOULE COMPANY, OF SYRACUSE, NEW YORK, A CORPORATION OF NEW YORK.

ACID MILK POWDER.

1,000,686.   Specification of Letters Patent.   Patented Aug. 15, 1911.

Application filed November 1, 1905. Serial No. 285,438.

*To all whom it may concern:*

Be it known that I, LEWIS C. MERRELL, of Syracuse, in the county of Onondaga, in the State of New York, have invented new and useful Improvements in Acid Milk Powder, of which the following, taken in connection with the accompanying drawings, is a full, clear, and exact description.

This invention relates to the production of an acid milk powder, wholly soluble in water, as a new article of manufacture.

My object is to produce an acid milk powder, soluble in water, which is distinctly acid in its character and reaction, and in which the physical character of the albumen, casein, fat, mineral salts, sugar, lactic acid, enzyms, and all other natural constituents remain the same as in the original acid milk before desiccation, as distinct from the acid milk powder heretofore produced, which is insoluble in water.

My further object is to produce an impalpable acid milk powder which is free from any foreign element and which is wholly and readily soluble in water and capable of complete restoration to its original liquid condition possessing the same properties as before desiccation.

It is a well known fact that milk which contains substantially more than .3 of 1% of acid will whey off at ordinary temperature, and the curd cannot then be dissolved except by the addition of an alkali or other chemical solvent. If milk which contains substantially more than .15 of 1% of acid is condensed or dried slowly the acid will combine with the salts in such a way as to render the casein insoluble when the acid in the condensed milk becomes substantially more than .75 of 1% of the total weight of the concentrated or partially dried milk. If partially sour milk is dried slowly at low temperature there is an increase in the total weight of the acid, in addition to the increase in the percentage due to concentration. For the temperatures usually employed in low temperature drying are such as to favor the growth of lactic-acid-producing bacteria.

The processes ordinarily employed in drying sour or partially sour milk are two: One consists of drying slowly in shallow pans. The effect of the lactic acid upon the salts, in this process, renders the curd in the dry powder product insoluble in water.
The other process consists of drying the sour or partially sour milk *in vacuo*. If steam is used in the jacket the thickening product gradually rises to the temperature of the walls of the steam filled jacket, even though the temperature of the vacuum may be as low as 130° F. with the result that the curd in the finished product is rendered insoluble in water. If heated water is used in the jacket instead of steam the drying proceeds so slowly that additional acid develops and the curd in the finished product is insoluble in water. If milk contains more than .15 of 1% of acid is dried rapidly at a temperature of 212° F. or above, the acid which is rendered more active by the heat will combine with the salts so as to render the casein insoluble in water. For this reason milk that is to be dried on heated cylinders is neutralized to prevent the slight acidity of fresh milk from rendering the casein of the milk insoluble in water. This is due to the fact that the acid combines with the salts which hold the casein in solution and renders it insoluble in the milk serum.

If the casein of the milk is to be kept soluble in water, the invariable practice, heretofore, has been to neutralize the lactic acid by the introduction of lime or other alkali, which in excess gives the milk an alkaline or soapy taste; changes the character of the casein and fat, and under certain conditions subjects the proteids to decomposition so that they in time develop a foul and unsavory odor.

It is well known that fresh warm milk, as it comes from the cow, contains only a very slight amount of acid, and that the amount of this acid gradually increases, as the milk grows older, in proportion to the temperature at which the milk is kept, owing to the action of the lactic acid bacteria.

To produce a dry milk containing any given amount of lactic acid, I first allow the milk to stand and retain its animal heat as long as may be necessary to produce the amount of acid which is desired as a constituent, or the acid may be developed by artificial heat. The length of time required to produce any given percentage of acidity in the milk is well known among scientists and appears in the leading publications, so that it will not be necessary to repeat it here. The milk is then cooled at such a temperature as will maintain the acidity at a predetermined degree. By experiment in this direction, I have found that the temperature of 60° F. will preserve milk so that it will develop not more than .01% of acid in the total volume in the liquid in 12 hours. I also find that a temperature of 54° F. will preserve the percentage of acid practically constant for a period of 12 hours, and I have also found that a temperature of 65° F. is usually sufficient for all practical purposes.

When a predetermined acidity is desired the milk is preferably cooled immediately after milking and afterward warmed to the proper temperature at the factory where a small amount of lactic ferment may be added, if necessary, to hasten the development of just the amount of acid required.

I have discovered by repeated experiments, tests and careful analysis that by desiccating the acid milk quickly at a low temperature without perceptible loss of time, I have avoided any substantial increase of acidity, and thereby have been able to produce an acid milk powder in which the casein is not rendered insoluble.

I claim to be the first to have produced such a product and that is my invention. I do not claim to be the sole inventor of the apparatus by which the acid milk is dried at a low temperature, so rapidly as to avoid increasing the acidity, but I do claim to be the first to discover that by such rapid evaporation or desiccation whereby the acidity is not increased, a new product is produced, namely, an acid milk powder wholly soluble in water. The apparatus for such drying is shown in the accompanying drawings and description thereof, in which,

Figure 1 is a transverse, and Fig. 2 is a longitudinal sectional view of a desiccating apparatus for carrying out the objects stated.

As stated above the fresh milk is first allowed to attain the desired percentage of acidity by the well known methods, after which it is introduced in a finely divided state into a suitable desiccating chamber —1— through a series of atomizers or spraying nozzles —2—, and this finely divided liquid spray is caused to commingle with a suitable moisture absorbing medium, such as air or gas, which may be forcibly introduced into the chamber —1— through a suitable inlet —3—. The moisture absorbing power of this fluent may be materially increased by first passing it through a cooler —5— by means of a fan or blower —6— and then forcing the cooled absorbent, by the same means, through a heating chamber —7— into the desiccating chamber —1—, care being taken, of course, to keep the temperature of the absorbent sufficiently low to prevent any chemical change or denaturalization in the constituents of the liquid or powdered milk during the process of desiccation. This commingling of the moisture absorbing air with the finely divided liquid causes the former to absorb and to hold in suspension practically all of the moisture from the milk, leaving a fine impalpable flour or precipitate which falls to the bottom of the chamber —1—, and under the pressure from the fan or blower —6— together with the moisture laden air is forced upwardly through a vibrating conduit —8—, the lower side of which is provided with a comparatively narrow inlet-slit —9— and is caused to traverse a concentric bottom —10— of the chamber —1—. This desiccated product containing practically all of the acid which was in the original acid milk at the time of introduction into the chamber —1—, but in a more concentrated form, is forced through the conduit —8— and into a suitable collecting vat —11— having a fine screen in one or more sides to allow the escape of the moisture-laden air to atmosphere, leaving the desiccated product in the vat.

As also the apparatus herein shown and described, forms no part of my present invention, therefore, it is believed to be unnecessary to enter into further description of its structure and operation.

In the manufacture of this acid milk powder, I have found by actual test that a liquid skimmed milk treated in the manner hereinbefore described so as to contain say, .27% acid, will, when reduced to a powdered condition contain about 3.1% acid, and by mixing this powder with the same quantity of water, which was in the original liquid milk before desiccation, it is restored to the same primal conditions possessing the same percentage of acid and other natural properties, including the capability of being coagulated as the original acid milk. I, therefore, believe that I have made an important and highly valuable discovery in that I am the first to produce a distinctly acid-milk powder in which the percentage of acidity may be verified at will from a minimum of say 1.25% to a maximum of, say 3.5% without in any way injuring the natural properties of, or producing any chemical change in the liquid or powdered milk or their constituents, it being found that any excess in the percentage of acid beyond .3% in the liquid milk, tends to curdle the liquid milk, which, of course, would tend to destroy the solubility of the desiccated product.

As further showing the utility of my improved process and its product, it may be stated that skimmed milk containing say, .29% of acid and desiccated in the manner described, produces a fine white powder containing the same total quantity of acidity as the original liquid milk and that this powder may be restored to the primal liquid state having the same properties as the liquid from which the powder was produced. As a further example, I have desiccated a skimmed milk containing about .2 of 1% of acid and have found that the desiccated product contains about 2.25% acid and that this highly acidulated powder is highly useful giving the same result as acid milk and avoiding any cheesy or alkaline flavor or yellowish tints so commonly produced in bake stuffs, by neutral or alkaline powders.

What I claim is:

1. A milk powder containing lactic acid so soluble in water as to approximate the original acid liquid milk.

2. A soluble milk powder containing from 1.25% to 3.5% of lactic acid.

3. An acid milk-powder wholly soluble in water.

In witness whereof I have hereunto set my hand on this 30th day of October, 1905.

LEWIS C. MERRELL.

Witnesses:
  J. M. HAMMEKEN,
  HOWARD P. DENISON.